United States Patent [19]

Legris

[11] 3,963,267

[45] June 15, 1976

[54] FLUID CONNECTOR

[75] Inventor: Andre Legris, St-Maur, France

[73] Assignee: Societe Legris France S.A., Ozoir-la-Ferriere, France

[22] Filed: May 20, 1974

[21] Appl. No.: 471,591

[30] Foreign Application Priority Data

June 5, 1973  France .............................. 73.20453

[52] U.S. Cl. ................................. 285/93; 285/169; 285/323; 285/370
[51] Int. Cl.² ........................................ F16L 17/02
[58] Field of Search ........... 285/322, 323, 105, 104, 285/113, 93, 257, 169, DIG. 19, 321, 370; 403/371, 369

[56] References Cited

UNITED STATES PATENTS

| | | | |
|---|---|---|---|
| 1,340,785 | 5/1920 | McMullin | 285/322 X |
| 2,111,956 | 3/1938 | Baldwin | 285/105 |
| 2,270,371 | 1/1942 | Frazier | 285/169 |
| 2,479,960 | 8/1949 | Osborn | 285/104 |
| 2,675,829 | 4/1954 | Livers | 285/322 X |
| 2,823,699 | 2/1958 | Willis | 285/DIG. 19 |
| 2,914,345 | 11/1959 | Osborn | 285/113 X |
| 3,185,504 | 5/1965 | Perrot et al. | 285/105 |
| 3,378,282 | 4/1968 | Demler | 285/93 X |
| 3,387,865 | 6/1968 | Ross | 285/322 X |
| 3,653,689 | 4/1972 | Sapy et al. | 285/322 X |
| 3,743,326 | 7/1973 | Courtot et al. | 285/323 X |

FOREIGN PATENTS OR APPLICATIONS

| | | | |
|---|---|---|---|
| 695,250 | 9/1964 | Canada | 285/321 |

*Primary Examiner*—Thomas F. Callaghan
*Attorney, Agent, or Firm*—Brooks Haidt Haffner & Delahunty

[57] ABSTRACT

The present invention relates to a connector for conduits, such as a pipe. Such a connector includes, a body, a ring member, a clamp having jaws and a throat on a pipe engageable by the jaws. Further, an O-ring seal is provided to seal the connector.

15 Claims, 15 Drawing Figures

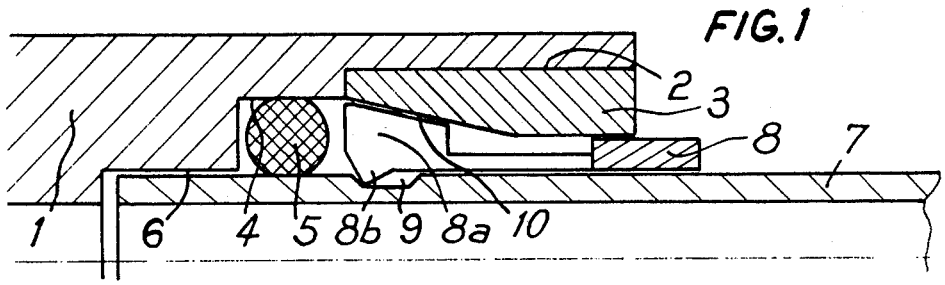
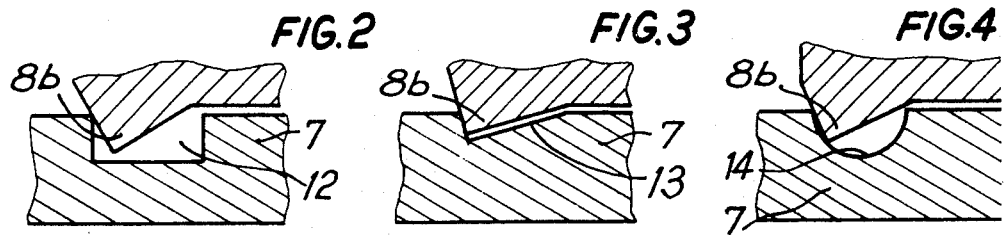
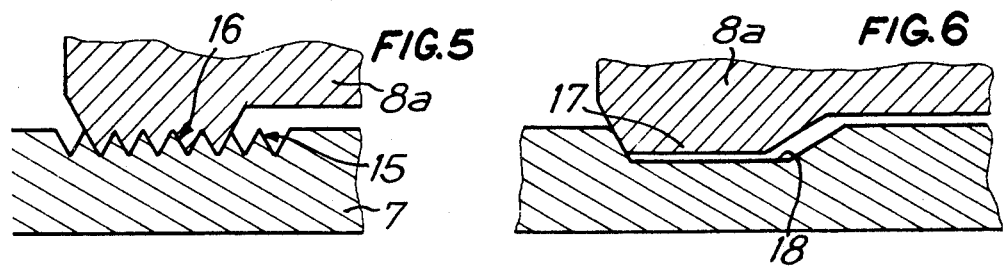
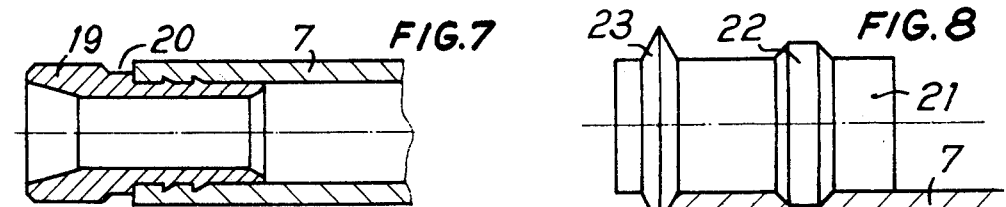
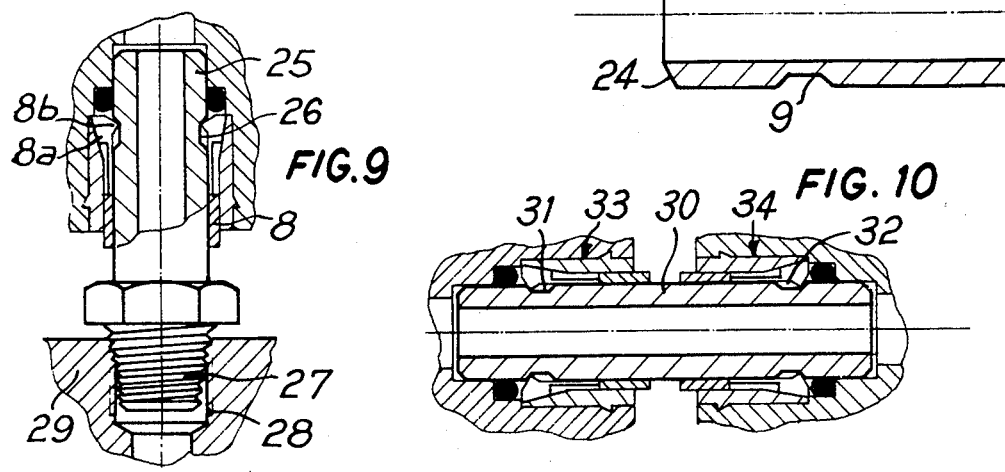

FLUID CONNECTOR

The present invention relates to a connector for connecting fluid conduits, such as pipes.

From French Patents Specification No. 69.17467 there is known a device for connecting conduits of fluid in which device a ring engaged in an orifice of the body of the coupling internally receives a flexible clamp having a plurality of jaws which are capable of being engaged in the wall of the conduit to be connected, the said ring having in its bore a divergent zone disposed inwardly of the coupling, for tightening the jaws of the clamp. Sealing is ensured by an O-ring of elastomer disposed between the body and the pipe.

Now, in the coupling device mentioned above jaws are employed which are engaged in the material forming the pipe and this method is not conducive to the frequent mounting and dismantling which movable accessories such as plugs, grooved sockets, reducers, tappings, twin male junctions, pressure gauges, etc require.

According to the present invention there is provided a connector for connecting fluid conduits, such as pipes, such a connector comprising a body, a ring member secured to the body member, the ring including a bore which is provided with a flared portion, a flexible clamp having a plurality of jaws for engaging in the region of the flared portion of the said bore, a pipe to be connected, an O-ring seal for sealing a pipe connection and a member either formed integrally with a pipe to be connected or being connectable with said pipe, and being adapted to be engaged by the O-ring seal, the member being provided with a throat adapted to be engaged by the jaws of the clamp.

The present connector is particularly useful in securing pressure gauges in position.

In particular, various types of pressure gauges which enable the absence or presence of pressure to be visually or manually observed are known. These devices are rarely removable and their installation is complicated since they are either crimped onto an apparatus or tightened on a compression coupling-piece.

Also known are various devices for measuring pressure by manometer and which are frequently permanently located. On certain pressure gauges it is possible to mount a movable manometer pressure pickup but this device is complex and costly and does not permit it to be snap-fitted onto an instantaneous coupling-piece.

With the present connector it is possible to provide pressure gauges, pressure measuring elements and any accessories or removable coupling-pieces with nozzles comprising a throat into which the jaws of the clamp are capable of locking automatically.

Illustrative embodiments of the invention will now be described with reference to the accompanying drawings, in which:

FIG. 1 is a view in section of one form of the present connector device;

FIGS. 2, 3, and 4 are sectional views of three different forms of throat that can be used in the present connector device;

FIG. 5 is a view of a device in which the jaws and the pipe have teeth;

FIG. 6 is a view of a device in which the jaws and the throat have complementary profiles;

FIG. 7 is a view of a pipe equipped with a nozzle having a throat;

FIG. 8 is a view of one embodiment of a throat on a pipe;

FIG. 9 is a view in section of a device employed with a threaded tapping;

FIG. 10 is a view in section of a twin male junction;

Figure 12:
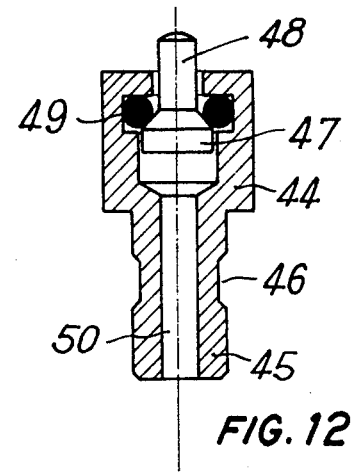
Figure 13:
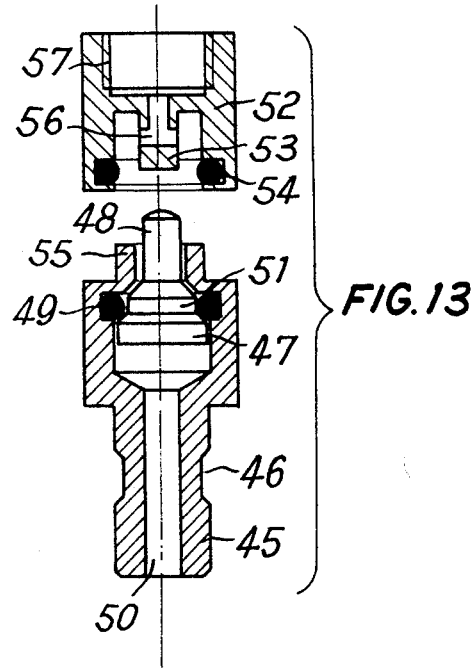
Figure 14:
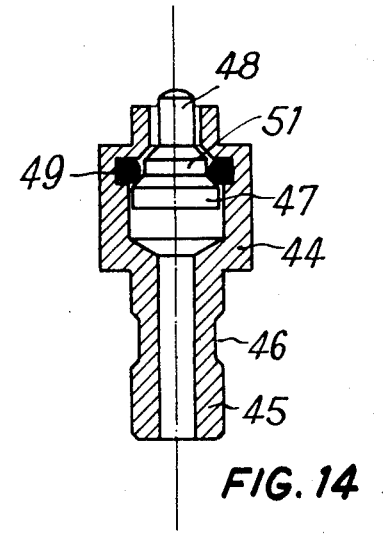
Figure 15:
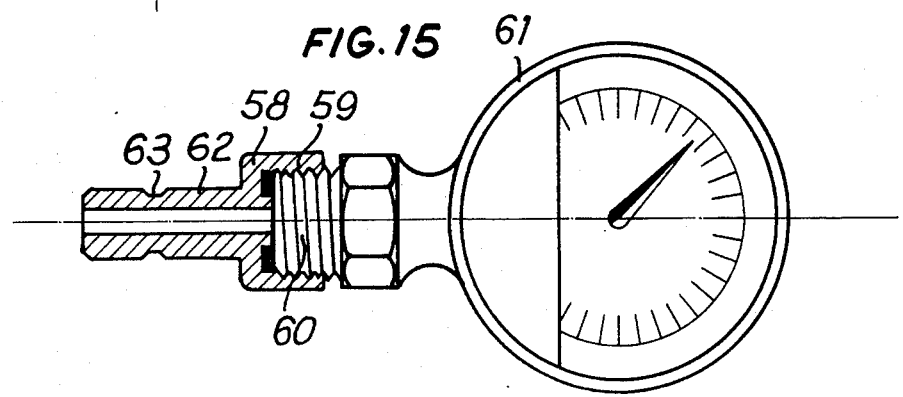

FIGS. 12, 13, and 14 show views of various forms of pressure gauge to which the present connector can be fitted;

FIG. 15 is a view in section of a connector for a pressure pick-up.

Referring firstly to FIG. 1 there is shown a connector body 1 having a first bore 2 in which a ring 3 is force sleeve-jointed. The body, is further provided with a bore 4 receiving an O-ring seal 5 and a bore 6 receiving the end of a pipe 7.

Slidingly mounted in the ring 3 is a clamp 8 which is provided with jaws 8a having teeth 8b adapted to be engaged in a throat 9 fashioned in a smooth portion of the pipe 7 when the clamp abuts against a flared portion 10 of the ring 3.

The throat 9 is in fact situated behind a smooth portion of the pipe which is contacted by the O-ring seal 5.

FIG. 2 shows a throat 12 of rectangular section in which the triangular tooth 8b is engaged.

FIG. 3 shows a throat 13 of triangular section which corresponds to the triangular shape of the tooth 8b.

In FIG. 4 there is shown a throat of semi-circular section in which the tooth 8b of triangular shape is engaged.

For very strong pressures the arrangements shown in FIGS. 5 and 6 are employed.

In FIG. 5 the pipe 7 comprises a plurality of teeth 15 representing a succession of throats which cooperate with a corresponding toothed portion 16 provided on the jaws 8a of the clamp 8.

In the embodiment of FIG. 6 the jaws 8a comprise teeth 17 of enlarged shape which are engaged in a throat 18 of matching configuration.

When uneven pipes are used the throats may be obtained by utilising a removable nozzle 19 which is sleeve-jointed or glued into the pipe 7 (FIG. 7), the said nozzle having a throat 20 located between the nozzle and the pipe 7.

Throats 9 of various configuration can be obtained by rolling the pipe 7 as is shown in FIG. 8, by means of a milling tool 21 having a circular rib 22 for machining the throat and a circular edge 23 effecting the severing of the pipe 7 as well as machining a chamfer 24 at the end of the pipe. This device provided with a throat can be applied to any tubular nozzles of coupling elements and movable accessories such as plugs, channelled sockets, reducers, tappings and junction members. A number of examples of the application of the present connector will now be described.

In FIG. 9 there is shown a connection element or tapping comprising at one side a tubular nozzle 25 having a throat 26 in which the teeth 8b of the jaws 8a of the clamp are engaged and at the other side a threaded portion 27 which is engaged in a tapped bore 28 of a collar 29.

FIG. 10 shows a twin male junction 30 having throats 31 and 32 at either side in which the teeth of two instantaneous coupling elements 33 and 34 are engaged.

Figure 11:
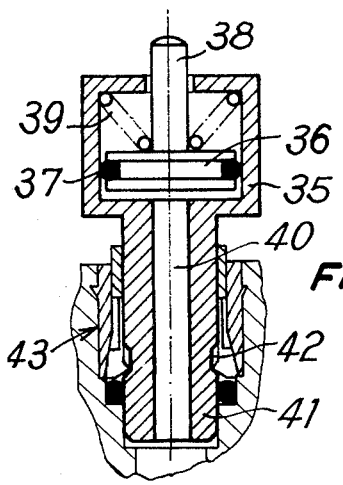
FIG. 11 is a view in section of a pressure gauge mounted on one form of the present device.

In FIG. 11 there is shown a pressure gauge comprising a body 35 in which a piston 36 equipped with an O-ring seal 37 is slidingly mounted. The piston 36 which includes a signalling button 38 is subjected to the action of a spring 39 which returns the button 38 to the withdrawn position in the absence of fluid. When the fluid coming from the line 40 acts on one of the faces of the piston 36 the latter is pushed back counter to the spring 39 and the button 38 comes into an extended position outside the body 35.

The body 35 is lengthened by a nozzle 41 which has a throat 42 in which the teeth of a connector 43 are engaged.

This pressure gauge is intended for use in continuous pressure circuits.

In FIG. 12 there is shown a pressure gauge provided with a leak-free manual check for pulsation circuits and for continuous pressure circuits. This pressure gauge comprises a body 44 which is extended by a nozzle 45 having a throat 46 in which the teeth 8b of a coupling are engaged. The body 44 internally receives a movable piston 47 having a signalling button 48 cooperating with an O-ring seal 49 disposed in a cavity of the body 44. The piston 47 is at one of its faces subjected to the action of the fluid coming from the conduit 50. When the pressure has subsided the button 48 remains in the position in which it had previously been. This device is called a memory device since the gauge remains in the position in which it has either manually or by the pressure action been placed.

In FIG. 13 there is shown a pressure gauge for pulsation circuits and for continuous pressure circuits. This pressure gauge is similar in general concentration to that shown in FIG. 12 and comprises a cylindrical portion 51 onto which extends a piston 47 which cooperates with the 0-ring 49. A pressure pick-up element 52 which includes a finger 53 holding the button 48 and the piston 47 in the lowered position when the element 52 is engaged on the pressure gauge. The pressure pick-up element is provided with an O-ring seal 54 engaged on a collar 55 of the pressure gauge. The finger 53 is provided with a conduit 56 which opens in a tapped bore 57 in which a manometer can be installed so as to establish communication between the duct 50 and the orifice of the manometer when the finger 53 holds the button 48 in the low position.

When the pressure pickup element is withdrawn the button 48 rises and the seal of the gauge is ensured by the O-ring 49. When the pressure has disappeared the button 48 remains in the position where it was previously and it can be made to disappear by hand. The pressure pickup element enables the pressure to be picked up and direct and rapid detection at any point of fluid circuits equipped with this kind of pressure gauge.

In FIG. 14 there is shown a pressure gauge for manual detection and with leakage. It is identical to the preceding gauge except as to the length of the cylindrical portion 51 carrying the O-ring 49. This cylindrical portion is short enough for a leakage to be produced during manual detection.

FIG. 15 shows a connection element which comprises a body 58 having a tapped bore 59 into which the threaded portion 60 of a manometer 61 is screwed. The body 58 is extended by a nozzle 62 having a throat 63 in which the teeth 8b of a clamp 8 of a rapid coupling device as described above can be engaged.

I claim:

1. A pipe joint comprising a longitudinally extending pipe having an internal bore and having at least one peripherally continuous, peripheral groove adjacent, but spaced from, an end thereof to provide a peripherally continuous throat adjacent said end and of a diameter less than the diameters of the outer surface of a first portion of said pipe intermediate said throat and said end and the outer surface of a second portion of said pipe on the side of said throat longitudinally opposite from said first portion and a longitudinally extending, releasable connector around said pipe at said end thereof, said connector comprising a body member having an internal bore and extending around both said first portion and said second portion of said pipe and having a flared internal surface portion overlying at least one of said groove and said second portion, said flared surface portion decreasing in diameter in a direction away from said end of said pipe, a plurality of individual, separately flexible jaws mounted in side-by-side peripherally spaced relation around the periphery of said pipe and intermediate said body member and said pipe, said jaws having inwardly extending projections extending into said groove to prevent longitudinal movement of said pipe with respect to said body member, said jaws abutting against said flared portion to prevent outward movement of said jaws and said jaws being longitudinally slidable with respect to said body member and having a portion extending outwardly from said body member to permit manual movement thereof inwardly of said body member, and an O-ring of flexible material intermediate said body member and said first portion of said pipe for providing a fluid seal therebetween.

2. A pipe joint as set forth in claim 1 wherein said body member comprises a ring around at least said second portion and said flared surface portion is on the inner surface of said ring.

3. A pipe joint as set forth in claim 2 wherein said groove is arcuate in longitudinal cross section.

4. A pipe joint as set forth in claim 2 wherein said groove, in longitudinal cross-section, has rectilinear walls.

5. A pipe joint as set forth in claim 4 wherein said walls form three sides of a rectangle.

6. A pipe joint as set forth in claim 4 wherein said walls form two sides of a triangle.

7. A pipe joint as set forth in claim 1 wherein said pipe has a plurality of peripherally continuous, peripheral grooves in longitudinally spaced relation at said end of said pipe and each of said jaws has a plurality of said projections mating with said grooves.

8. A pipe joint as set forth in claim 1 wherein said groove and said projections have, in longitudinal cross-section, mating cross-sections.

9. A pipe joint as set forth in claim 1 wherein said pipe comprises two parts, one part forming said first portion of said pipe on one side of said throat and the other part forming said second portion of said pipe on the other side of said throat, each of said parts having an internal bore and one of said parts being secured to the other of said parts with the bore of one aligned with the bore of the other.

10. A pipe joint as set forth in claim 1 wherein said pipe has a further peripherally continuous, peripheral groove adjacent, but spaced from, the end of said pipe opposite from said first-mentioned end thereof.

11. A pipe joint as set forth in claim 1 further comprising a slidable piston within said bore of said pipe and at the end thereof opposite from said first-mentioned end, said piston having an extension extending outwardly from said opposite end, and an O-ring of flexible material within said bore and engagable with said piston for providing a fluid seal between said pipe and said piston.

12. A pipe joint as set forth in claim 11 further comprising spring means acting between said piston and said pipe for biassing said piston into a predetermined position.

13. A pipe joint as set forth in claim 12 wherein said O-ring is secured to said piston for movement therewith.

14. A pipe joint as set forth in claim 11 wherein said piston is slidable between two positions and wherein said O-ring is engagable with said piston in one of said positions.

15. A pipe joint as set forth in claim 11 further comprising a pressure pick-up member having means for securing said pick-up member to said opposite end of said pipe and having means engagable with said piston extension for maintaining said piston out of engagement with said O-ring.

* * * * *